No. 616,192. Patented Dec. 20, 1898.
W. A. KING.
CREAM SAVER.
(Application filed Feb. 16, 1898.)

(No Model.)

Witnesses
Inventor
William A. King
By H. B. Willson & Co.
Attorneys

UNITED STATES PATENT OFFICE.

WILLIAM A. KING, OF PIERRE, SOUTH DAKOTA.

CREAM-SAVER.

SPECIFICATION forming part of Letters Patent No. 616,192, dated December 20, 1898.

Application filed February 16, 1898. Serial No. 670,538. (No model.)

*To all whom it may concern:*

Be it known that I, WILLIAM A. KING, a citizen of the United States, residing at Pierre, in the county of Hughes and State of South Dakota, have invented certain new and useful Improvements in Cream-Savers; and I do declare the following to be a full, clear, and exact description of the invention, such as will enable others skilled in the art to which it appertains to make and use the same.

My invention has relation to cream-savers; and the object is to provide means whereby the cream and stratum of milk below the same may be separated from the poorer milk in a simple and expeditious manner.

With this object in view the invention consists in certain features of construction and combination of parts, which will be hereinafter fully described and claimed.

Figure 1:
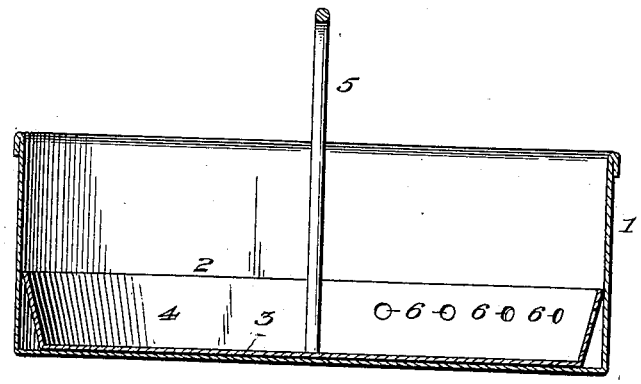
Figure 2:
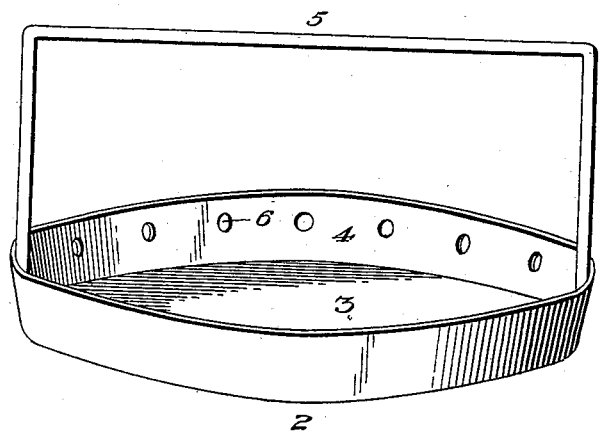

In the accompanying drawings, Figure 1 is a sectional view through a milk-pan and the cream-separator, and Fig. 2 is an enlarged perspective view of the separator removed.

In said drawings, 1 denotes a milk-pan or other receptacle adapted to contain the milk, and 2 denotes the separator, which comprises an imperforate bottom 3, having an annular flange 4, which is inclined outwardly.

5 denotes a bail or handle attached to the flange, and 6 denotes a horizontal row of perforations about five-eighths of an inch from the bottom of the pan and formed on one side of the flange, the other side being imperforate.

In operation the device is first placed in the settling-pan, which is then filled with milk in the usual manner and the whole allowed to remain undisturbed until the cream rises. The device is then lifted by its handle, and when the edge of the saver cuts the cream around the edge of the pan the center of the cream will fall to the bottom of the saver and a small portion of the milk will be forced out through the perforations, while the cream, being of a much greater consistency, will not pass through the holes, but remain in the saver, from which it can be easily poured by inverting the saver in such a manner as to allow the cream to pass over the portion of the saver not perforated.

Having thus described my invention, what I claim, and desire to secure by Letters Patent, is—

1. As an improved article of manufacture, a cream-saver, consisting of the plane imperforate bottom, an annular flange, and a handle, one half of said flange being imperforate and the other half formed with a series of orifices arranged in the same plane and parallel with the bottom, substantially as shown and described.

2. As an improved article of manufacture, a cream-saver consisting of the plane imperforate bottom, an annular flange and a rigid diametrical handle fixed to the opposite sides of said flange one half of said flange extending between the handle being formed with a series of orifices and the remaining half of said flange being imperforate, substantially as shown and described.

In testimony whereof I have hereunto set my hand in presence of two subscribing witnesses.

WILLIAM A. KING.

Witnesses:
 FRED A. FOOTE,
 C. A. BARTLETT.